United States Patent
Quere et al.

(10) Patent No.: US 10,694,240 B2
(45) Date of Patent: Jun. 23, 2020

(54) METHOD FOR DECODING AN AUDIO/VIDEO STREAM AND CORRESPONDING DEVICE

(71) Applicant: INTERDIGITAL CE PATENT HOLDINGS, Paris (FR)

(72) Inventors: Thierry Quere, Montfort sur Meu (FR); Francois-Xavier Seingier, Rennes (FR); Renaud Rigal, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/461,777

(22) PCT Filed: Nov. 13, 2017

(86) PCT No.: PCT/EP2017/079037
§ 371 (c)(1),
(2) Date: May 16, 2019

(87) PCT Pub. No.: WO2018/091403
PCT Pub. Date: May 24, 2018

(65) Prior Publication Data
US 2019/0364327 A1    Nov. 28, 2019

(30) Foreign Application Priority Data
Nov. 16, 2016   (EP) ..................................... 16306495

(51) Int. Cl.
*H04N 21/43*    (2011.01)
*H04N 21/438*   (2011.01)
*H04N 21/6587*  (2011.01)

(52) U.S. Cl.
CPC ..... *H04N 21/4307* (2013.01); *H04N 21/4382* (2013.01); *H04N 21/4384* (2013.01); *H04N 21/6587* (2013.01)

(58) Field of Classification Search
None
See application file for complete search history.

(56) References Cited

U.S. PATENT DOCUMENTS 6,130,987 A   10/2000  Tanaka
8,368,811 B2   2/2013  Itani
(Continued)

FOREIGN PATENT DOCUMENTS

CN   102938849 A   2/2013
EP      2048890     4/2009
(Continued)

OTHER PUBLICATIONS

Steinbach et al., "Adaptive Playout For Low Latency Video Streaming", 2001 International Conference on Image Processing (ICIP 2001), Thessaloniki, Greece, Oct. 7, 2001, pp. 962-965.

*Primary Examiner* — Eileen M Adams
(74) *Attorney, Agent, or Firm* — Volpe and Koenig, P.C.

(57) ABSTRACT

After a stream transition event such as a channel change, a drift between audio and video presentation time stamps in an audio/video stream is determined. The thus determined drift serves to compute a duration of a slow video motion start sequence with a given slow video rate, so that video can be shown early without yet being synchronized with audio. The slow video motion start enables the audio to catch up with the video and allows to ensure a synchronization of audio with video after the duration of the slow video motion start sequence, where after video and audio are synchronized and evolve normally. The present principles use a single decoder clock that is fed to the audio and video decoders, the decoder (Continued)

clock fed to the video decoder being offset with a decreasing value during the period of slow video motion.

10 Claims, 10 Drawing Sheets

(56) References Cited

U.S. PATENT DOCUMENTS

| | | | |
|---|---|---|---|
| 8,655,143 B2 | 2/2014 | Begen et al. | |
| 2006/0002681 A1* | 1/2006 | Spilo | H04N 5/76 |
| | | | 386/220 |
| 2006/0251391 A1* | 11/2006 | Saeki | G11B 19/022 |
| | | | 386/328 |
| 2009/0148131 A1 | 6/2009 | Akgul | |
| 2015/0177940 A1* | 6/2015 | Trevino | H04L 67/08 |
| | | | 715/716 |

FOREIGN PATENT DOCUMENTS

| | | |
|---|---|---|
| JP | 3063838 | 7/2000 |
| WO | WO 2009094841 A1 | 8/2009 |
| WO | WO 2012091203 A1 | 7/2012 |

\* cited by examiner

METHOD FOR DECODING AN AUDIO/VIDEO STREAM AND CORRESPONDING DEVICE

This application claims the benefit, under 35 U.S.C. § 365 of International Application PCT/EP2017/079037, filed Nov. 13, 2017, which was published in accordance with PCT Article 21(2) on May 24, 2018, in English, and which claims the benefit of European Patent Application No. 16306495.9, filed Nov. 16, 2016.

FIELD

The present disclosure generally relates to the field of rendering of audio/video streams in an audio/video receiver device, and in particular to fast channel change and support of audio/video trick modes.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Manufacturers of electronic devices make a continuous effort to improve the user-friendliness of their devices in order to satisfy customer requirements. Fast channel change and in general fast audio/video stream start after a stream transition event such as initiation of a trick mode remains a challenging topic for improvement.

There is thus a continuing need for further optimization audio/video stream rendering.

SUMMARY

According to one aspect of the present disclosure, a method for decoding an audio/video stream is provided. The method is implemented by an audio/video stream receiver and includes receiving a stream transition event, receiving an audio/video stream further to the stream transition event, obtaining a drift between a video presentation time stamp and an audio presentation time stamp comprised in the audio/video stream, obtaining a duration of a slow video motion start sequence based on the drift and as a function of a slow video decoding rate used for decoding the video during the duration of the slow video motion start sequence, initializing a decoder clock with a value of a program clock reference from the audio/video stream, providing the decoder clock to an audio decoder in the audio/video stream receiver, and providing the decoder clock to a video decoder in the audio/video stream receiver, the decoder clock provided to the video decoder being offset with an initial non-zero offset value and with a decreasing offset value until the offset reaches a zero offset value at the end of the duration of the slow video motion start sequence.

According to a particular embodiment of the method for decoding an audio/video stream, the initial non-zero offset value is a function of the drift and of a frequency of the decoder clock.

According to a particular embodiment of the method for decoding an audio/video stream, the method further includes synchronizing offsetting of the decoder clock provided to the video decoder with a frame rate of video comprised in the audio/video stream.

According to a particular embodiment of the method for decoding an audio/video stream, the offset value is decreased during the duration according to a linear function.

According to a particular embodiment of the method for decoding an audio/video stream, the offset value is decreased during the duration according to an exponential function.

According to a particular embodiment of the method for decoding an audio/video stream, the decreasing of the offset value is reevaluated as a function of variations of the drift.

According to one aspect of the present disclosure, a device for decoding an audio/video stream is provided. The device includes at least one reception interface configured to receive a stream transition event and configured to receive an audio/video stream further to the stream transition event. The device further includes a controller configured to obtain a drift between a video presentation time stamp and an audio presentation time stamp comprised in the audio/video stream, to obtain a duration of a slow video motion start sequence based on the drift and as a function of a slow video decoding rate used for decoding the video during the duration of the slow video motion start sequence, to initialize a decoder clock with a value of a program clock reference from the audio/video stream, to provide the decoder clock to an audio decoder included in the device, and to provide the decoder clock to a video decoder comprised in the device, the decoder clock provided to the video decoder being offset with an initial non-zero offset value and with a decreasing offset value until the offset reaches a zero offset value at the end of the duration of the slow video motion start sequence.

According to a particular embodiment of the device for decoding an audio/video stream, the processor is further configured to obtain the initial non-zero offset value as a function of the drift and of a frequency of the decoder clock.

According to a particular embodiment of the device for decoding an audio/video stream, the processor is further configured to synchronize the offsetting of the decoder clock provided to the video decoder with a frame rate of video comprised in the audio/video stream.

According to a particular embodiment of the device for decoding an audio/video stream, the processor is further configured to decrease the offset value during the duration according to a linear function.

According to a particular embodiment of the device for decoding an audio/video stream, the processor is further configured to decrease the offset value during the duration according to an exponential function.

According to a particular embodiment of the device for decoding an audio/video stream, the processor is further configured to reevaluate decreasing of the offset value as a function of variations of the drift.

BRIEF DESCRIPTION OF THE DRAWINGS

More advantages of the present disclosure will appear through the description of particular, non-restricting embodiments. In order to describe the manner in which the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure.

The exemplary embodiments will be described with reference to the following drawings in which.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In digital audio/video stream transmission, an audio/video stream, i.e. a stream comprising video and accompanying audio, is encoded by an encoder and transmitted by a streaming server to a receiver in a combined, or multiplexed, packet stream. In this combined packet stream, each packet type (audio or video) has a different packet identifier (PID) which is stored in packet headers. On the receiver side, the receiver can pick out the audio and the video packets from the audio/video stream multiplex based on their PIDs, and feed them to the appropriate audio and video decoders. Because of the high density of information of video compared to that of audio, the bit rate of a video stream is many times higher than the bit rate of an accompanying audio stream. At the encoder, the audio is encoded and the audio packets are placed in between the video packets. It is not always possible to mix the audio and the video packets in the combined audio/video stream in such a manner that immediate synchronization between the two is possible by a receiver. For example, the encoding of a complex scene (e.g., a highly dynamic scene) results in a burst of video packets output by the video encoder, as the video compression rate is low since there is relatively low similarity between subsequent images of the complex scene. If the complex scene is accompanied by audio, the audio packets produced by the audio encoder cannot always be placed near to the video frames of the scene to which they belong as there are relatively few free transmission slots in the audio/video stream during the transmission of the video packets belonging to the complex scene. A certain amount of buffering is therefore required at the receiver side to ensure that enough audio/video data is received before the decoding process is started, to avoid so-called 'data starvation', meaning interruption caused by a lack of data. Additional buffering is required to ensure that the decoding of the video stream is synchronized with the audio stream. In other words, the video stream decoding must wait for the accompanying audio packets to be received so that the decoding can be operated in a synchronized manner, so that video with lip synchronous audio is presented to a viewer. In addition, if the audio/video stream is transmitted over a constant bit rate link, the transmission of a highly complex scene will require more time than the transmission of a less complex scene. However, the receiver must render each scene within a same amount of time. Furthermore, due to the non-isochronous transmission of packets over a streaming medium such as an Internet Protocol link, packets may be received out of order, in which case reordering on the receiver side is required, and with varying delays.

The above discussed problems are non-exhaustive. Buffering is thus required at the receiver side to cope with these different delays in order to render the audio/video stream without interruption and with lip synchronized audio. The BT.1359-1: *Relative Timing of Sound and Vision for Broadcasting* ITU-R 1998 norm and IS-191: *Relative Timing of Sound and Vision for Broadcast Operations* ATSC 2003-06-26, for example consider that audio/video desynchronization should remain between −30 ms (sound delayed with regard to vision) and +22.5 ms (sound advanced with regard to vision). For example, to receive a Dolby® certification, these tolerances are required to remain between −30 ms and +20 ms.

The buffering requirement on the receiver side is however a cause of an observable delay when a user changes channel, or when a user engages a trick mode operation on an audio/video stream that is provided by a server, since the 'new' stream decoding is only allowed to start after some buffering.

As discussed above, the delay between the arrival of video packets and of audio packets that are destined to be decoded with the video packets at the receiver is one of the causes of the buffering requirement, and thus of the channel change delay. The delay between the arrival video and corresponding audio packets is further referred to herein as 'audio/video drift'.

According to the present principles, the audio/video drift is computed (obtained) after (following, further to) a stream transition event. Stream transition events occur for example at channel change or after a trick mode action, e.g., a go to next chapter seek, which is equivalent, for the receiver, to any other stream transition event. A delay for the moment of lip synchronization between the audio/video stream is then determined. First video frames are played out early at low speed as soon as they are available for decoding, i.e. after a small delay required to avoid interruption due to starvation. Audio is played as soon as audio packets are available for decoding, i.e. after a small buffering delay required to avoid interruption due to starvation, at normal play speed. Video play out speed is then stepwise increased to reach normal play out speed at the moment of lip synchronization, after which the video is played at normal play speed.

As mentioned, an audio/video stream is constructed by an encoder. The encoder operation is governed by an encoder clock. An audio/video stream typically includes periodically inserted time stamps of the encoder clock in the form of Program Clock References (PCR) and separate time stamps for video and audio packets in the form of Decoding- and Presentation Time Stamps (DTS and PTS). The audio and video DTS/PTS indicate a desired decoding- and presentation time of audio and video frames and are relative to the PCR. A receiver typically includes a local oscillator or System Time Clock (STC) that is used as a receiver internal clock that governs the receiver's decoding operations. The STC is a counter that is incremented with a frequency that is supposed to evolve with a same rate as the encoder clock to avoid reception buffer under- and overflow due to too slow or too fast decoding rate. In Internet Protocol receivers the STC is initialized once after a stream transition event with a PCR present in (from, obtained from) the received audio/video stream.

Figure 1:
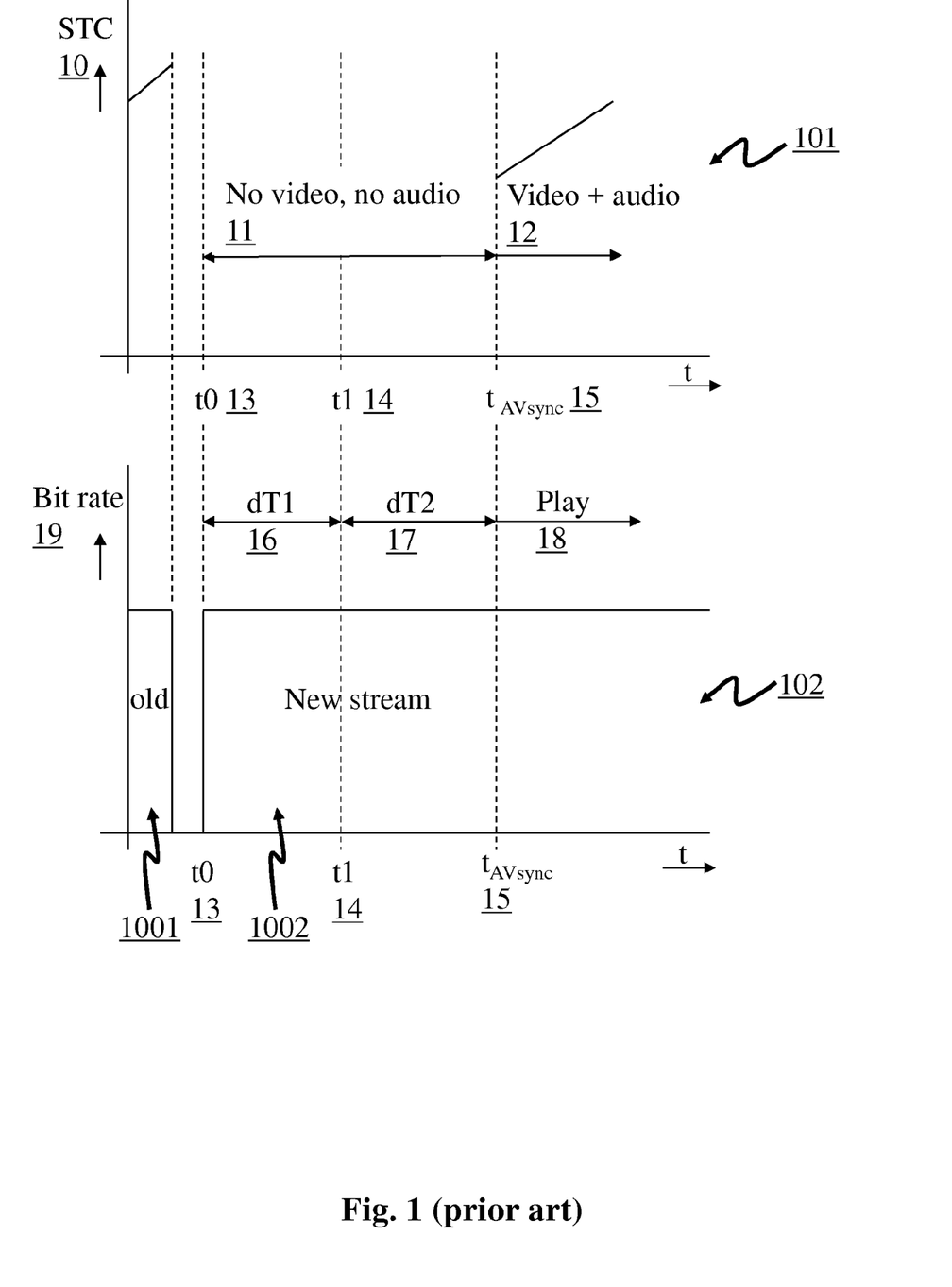
FIG. 1 illustrates a prior art process of audio and video decoding.

FIG. 1 illustrates a prior art process of audio and video decoding. FIG. 1 includes two graphs. Bottom graph 102 represents arrival of a constant bit rate audio/video stream at the prior art receiver. Top graph 101 represents an evolution of a decoder clock STC 10 included in the prior art receiver. Plotted on the vertical axis of the bottom graph is bit rate 19, while on the vertical axis of the top graph 101 is the value of the receiver's STC 10. The horizontal axes of both graphs indicate time t.

Reference 1001 indicates audio/video stream data received at the prior art receiver from a previous channel. Reference 1002 indicates audio/video data received at the prior art receiver from a next channel, i.e. after a channel change. Audio/video decoding really takes place during period 12, i.e. after a buffering delay. The buffering delay includes a first buffering delay dT1 (for delta T1) 16 from t0 13 (first reception of data at the receiver) to t1 14. dT1 16 is a buffering delay required to avoid data starvation. The buffering delay further includes a second buffering delay dT2 17 (for delta T2) from t1 14 to tAVsync 15 that is required to ensure that audio and video can be rendered in a synchronized manner. After a total delay of dT1+dT2, the reception buffer is filled and decoding of audio and video is started (play 18). To start the decoding the decoder clock is initialized with the encoder PCR included in the received new audio/video stream 1002. The decoder clock then progressively increases. It can thus be observed that there is no video nor audio decoding from t0 13 to tAVsync 15, i.e. during period 11.

Figure 2:
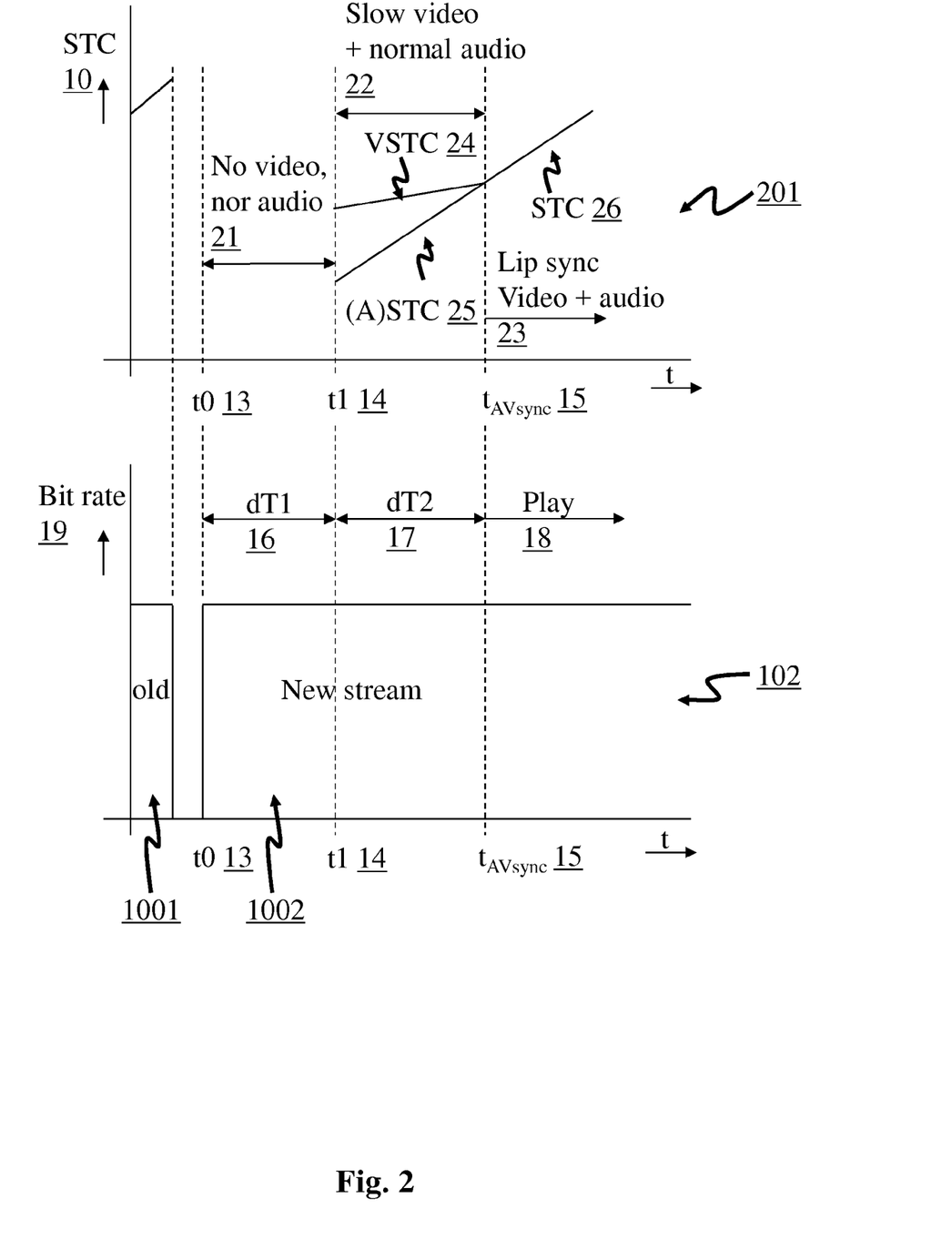
FIG. 2 illustrates a process of audio and video decoding according to the present principles.

FIG. 2 illustrates a process of audio and video decoding according to the present principles. Top graph 201 shows that decoding of audio and video is started as soon as t1 14. Audio decoding is started at normal playout rate as the audio decoder is fed with the STC 25, i.e. at t1 14. Video decoding however is started with a VSTC 24 that is based on the STC plus an offset. This offset is reduced to zero at tAVsync 15, so that from that moment on, the STC fed to the video decoder equals the STC 26 fed to the audio decoder. The slow decoding of video frames during period 22 from t1 14 to tAVsync 15 (slow video motion start sequence, slow video decoding rate) allows the audio packets to catch up with the video packets. Thus, a user will observe that audio and video is rendered quickly after (following, further to) a stream transition event (i.e., from t1 14). Audio plays normally, while lagging behind video during a period a slow video motion start sequence 22, until video and audio are synchronized at tAVsync 15, where after audio and video play normally 23 in a synchronized manner. The duration of no video and no audio decoding and rendering is reduced to period 21 from t0 13 to t1 14 and corresponds to buffering delay dT1 16.

Figure 3:
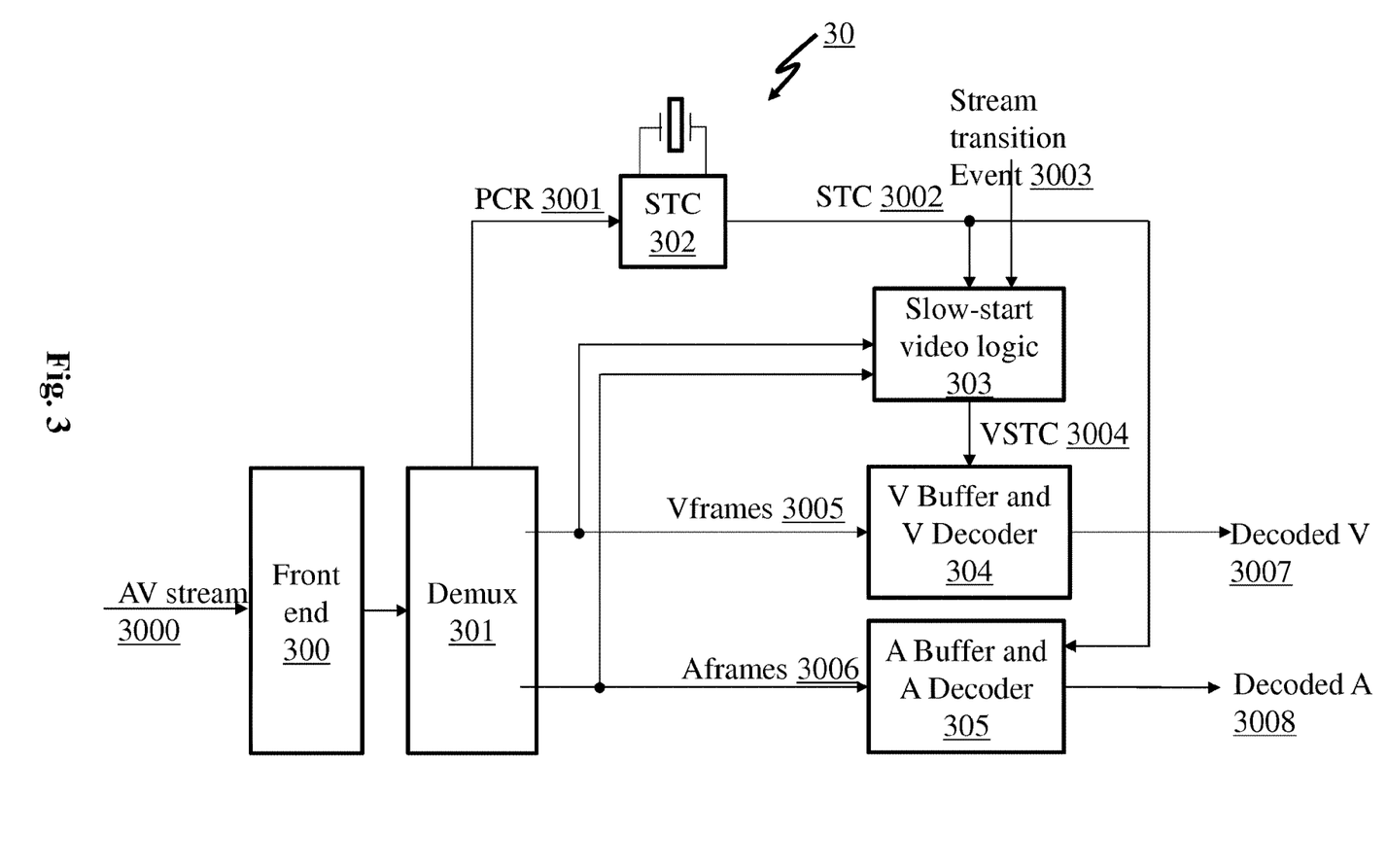
FIG. 3 is a block diagram of specific elements of a digital audio/video stream receiver according to the present principles.

FIG. 3 is a block diagram of specific elements of a digital audio/video stream receiver 30 according to the present principles. An audio/video stream AVstream 3000 is received from a streaming source (not shown) to front end 300. Front end 300 is for example a network interface or a tuner. The audio/video stream 3000 is delivered to the receiver's demultiplexer 301. Based on the audio and video program identifiers (PIDs) of elementary program streams included in the audio/video stream, the demultiplexer 301 is programmed by the controller to separate the multiplexed audio/video stream 3000 into a video frame stream 3005 and an audio frame stream 3006. Each of these separate streams is buffered separately in a buffer which is of a size that is sufficient to avoid data starvation; video frames are buffered in a video buffer and video decoder 304, while audio frames are buffered in an audio buffer and audio decoder 305. The demultiplexer 301 also retrieves PCRs 3001 from the audio/video stream 3000 from packets containing PCR. These PCRs 3001 are provided to the System Time Clock 302, which uses them to synchronize with the encoder clock. The release of decoded audio frames is triggered from t1 by the STC clock 3002 from STC 302. The release of decoded video frames is triggered from t1 to tAVsync by STC clock 3002 plus an offset, and from tAVsync and further on by the STC clock 3002 as the slow-start video logic will have reduced the offset to zero at tAVsync and from tAVsync and further on STC 3002 and VSTC 3004 will be the same. The video decoding clock VSTC 3004 is provided to the video decoder 304 by slow-start video logic 303. Slow-start video logic 303 receives as inputs the STC clock 3002 from STC 302, the non-buffered video frames 3005 and the non-buffered audio frames 3006, a stream transition event 3003, and produces as output the video decoding clock VSTC 3004 to video decoder 304. Video decoder 304 and audio decoder 305 produce decoded video 3007 respectively decoded audio 3008, that is fed to a video respectively audio interface driver (not shown) such as according to DVI (Digital Video Interface) or HDMI (High Definition Multimedia Interface). It can thus be seen that according to the present principles, there is only a single hardware clock, STC 302, which is used by the video 304 decoder (however with an offset during the slow start video motion sequence) and to the audio 305 decoder. This is advantageous as it enables a lip synchronization that is, for example, within the previously discussed tight tolerances required for a Dolby® certification as a same and single hardware decoding clock 302 is used for both audio and video decoding.

Figure 4:
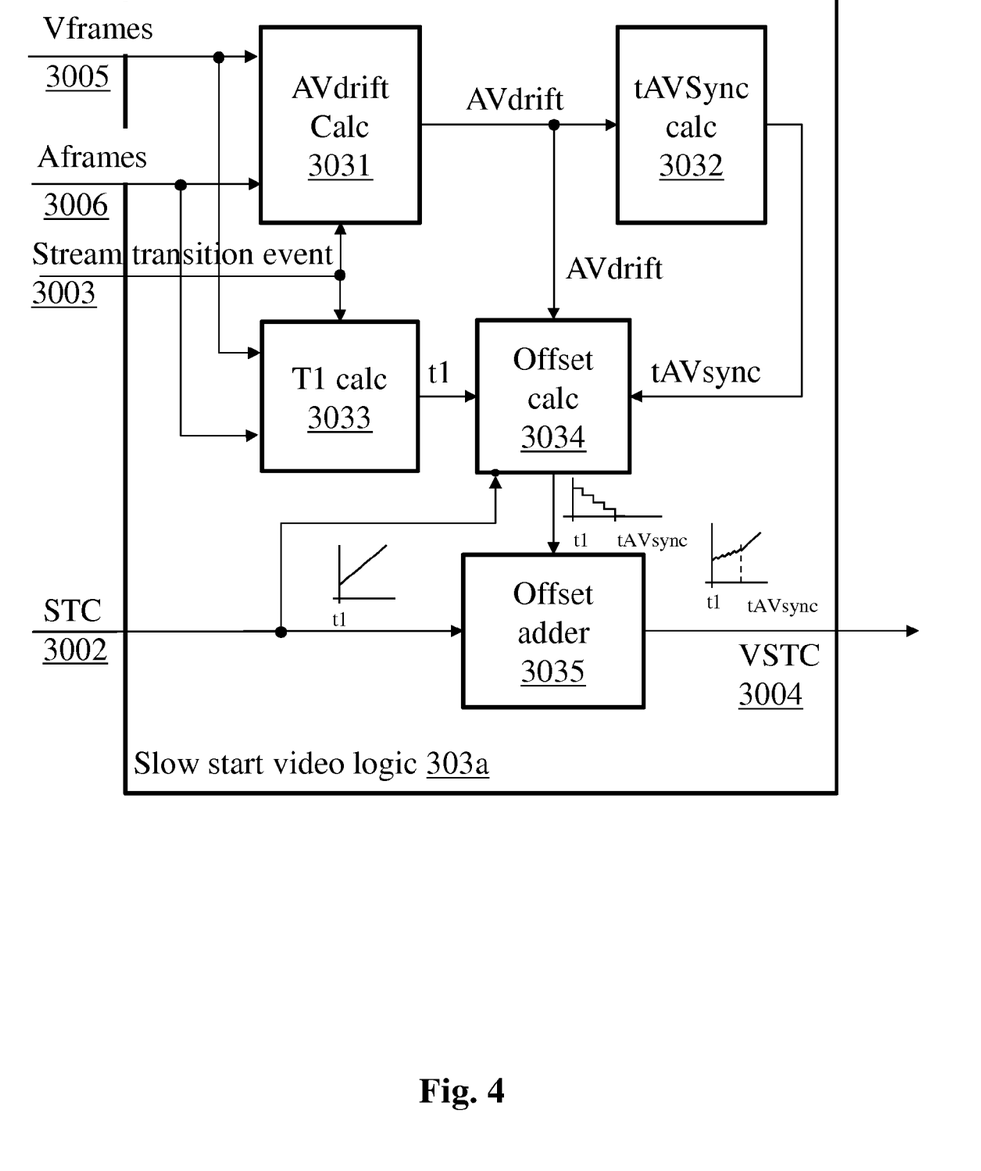
FIG. 4 is a block diagram of an exemplary embodiment of a slow-start video logic according to the present principles.

FIG. 4 is a block diagram of a specific embodiment 303a of slow-start video logic 303. Buffered video frames 3005 and audio frames 3006 are provided to AVdrift computing (obtaining) element 3031. AVdrift computing element 3031 also receives as input the stream transition event 3003. If a stream transition event 3003 is received, AVdrift computing element 3031 computes (obtains) the drift between audio and video according to the following equation:

$$AVdrift = ((firstPTSV - firstPTSA)/f_{stc}) - (firstPTSVDate - firstPTSADate) \quad (1)$$

AVdrift is thus expressed according to (1) in milliseconds. Parameter fSTC represents the frequency of the STC 302 in kHz (e.g., 90 kHz for an MPEG2 audio/video stream). Parameter firstPTSV is the value of the first PTS of a video frame from among the buffered video frames. Parameter firstPTSA is the value of the first PTS of an audio frame from among the buffered audio frames. Parameter firstPTSVDate is the moment of reception of firstPTSV. Parameter firstPTSADate is the moment of reception of the firstPTSA. firstPTSVDate—firstPTSADate is to compensate for a delay of reception of the first PTS video and first PTS audio.

The AVdrift thus computed (obtained) by AVdrift computing element 3031 is input to a tAVsync computing (obtaining) element 3032. This element 3032 computes (obtains) the moment of possible synchronization between audio and video. This moment depends from the slow rate of the initial video decoding and on the computed (obtained) AVdrift according to the following equation:

$$tAVsync = t1 + AVdrift/(1 - SlowVideoRate) \quad (2)$$

According to a particular embodiment the slow video decoding rate SlowVideoRate (i.e., from t1 to tAVsync) is considered as being a fixed parameter, e.g., 50% of audio play (decoding) rate. According to a further embodiment, this slow video decoding rate is variable, for example, exponentially increasing from 5% of audio play (decoding) rate at t1 to 100% of audio play (decoding) rate at tAVsync. With AVdrift and tAVsync thus computed (obtained), an offset to add to each new value of the STC is computed (obtained) in offset calculator 3034. T1 calculator 3033 uses the inputs stream transition event 3003, Aframes 3006 and Vframes 3005 to compute (obtain) t1, the starting point for offset calculator 3034. At the starting point t1, the offset to add to the STC 3002 is for example set to the number of ticks the STC would be increased during the time lap AVdrift, i.e.:

$$Offset@t1 = AVdrift * 1/fSTC \quad (3)$$

The initial non-zero offset value is thus a function of the AVdrift and of the frequency of the decoder clock.

It is an objective that at the end point tAVsync, the offset to add to the STC for the video decoding clock will converge to zero. Therefore the offset calculator 3034 decreases the offset added by offset adder 3035 to each new value of the STC from the initial non-zero value computed (obtained) e.g. according to equation (3) at t1 to a zero value at tAVsync.

The moment of possible synchronization between audio and video (tAVsync) being related to (dependent of) the AVdrift, is also related to (dependent of) the slow video decoding rate, see equation (2). Consequently, it is possible according to the present principles, to adjust (choose, select) the slow video decoding rate as a function of the AVdrift to target a moment of synchronization between audio and video and keep this moment of synchronization within bounds (limit to a maximum value) even if AVdrift differs upon stream transition events, e.g., when changing channel. The moment of synchronization (duration of the slow video start sequence) between audio and video tAVsync being known when this moment is set to a fixed maximum duration, the initial non-zero offset value being computed according to (3), the frequency of the STC being known and thus the number of clock ticks of the STC being known during the duration of the slow video start sequence, the decrease of the offset value at each STC tick can be computed so that the offset starts from the initial offset value at t1 and so that it reaches zero at tAVsync. See FIG. 4, offset calculator 3034 receives inputs from t1 calculator 3033, AVdrift value from AVdrift calculator 3031, tAVsync from tAVsync calculator 3032, and fSTC from STC 3002.

Figure 5A:
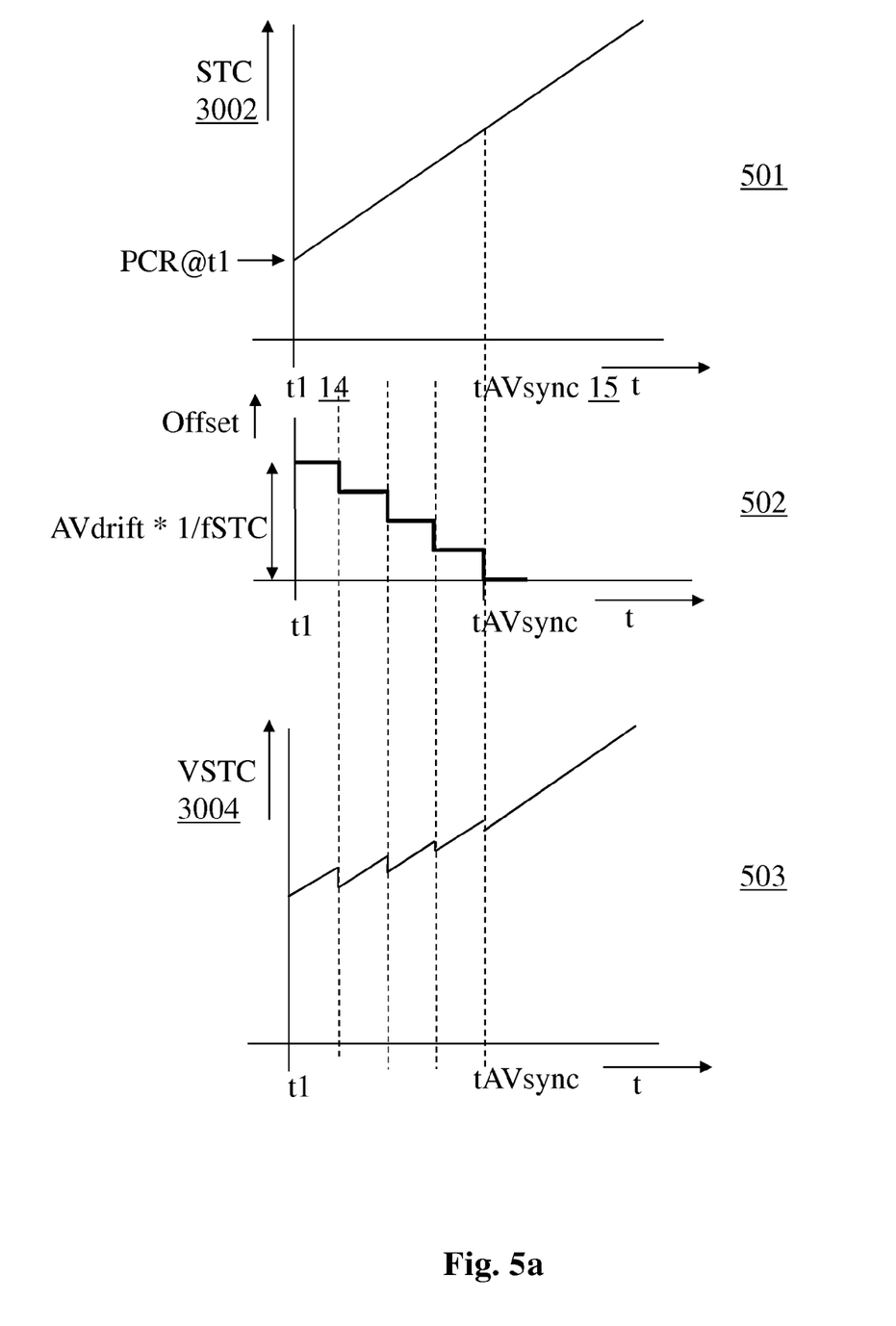
FIGS. 5a-c are a set of graphs that give a further visual explanation of a construction of decoding clock values from the decoder clock for video decoding according to the present principles.
Figure 5B:
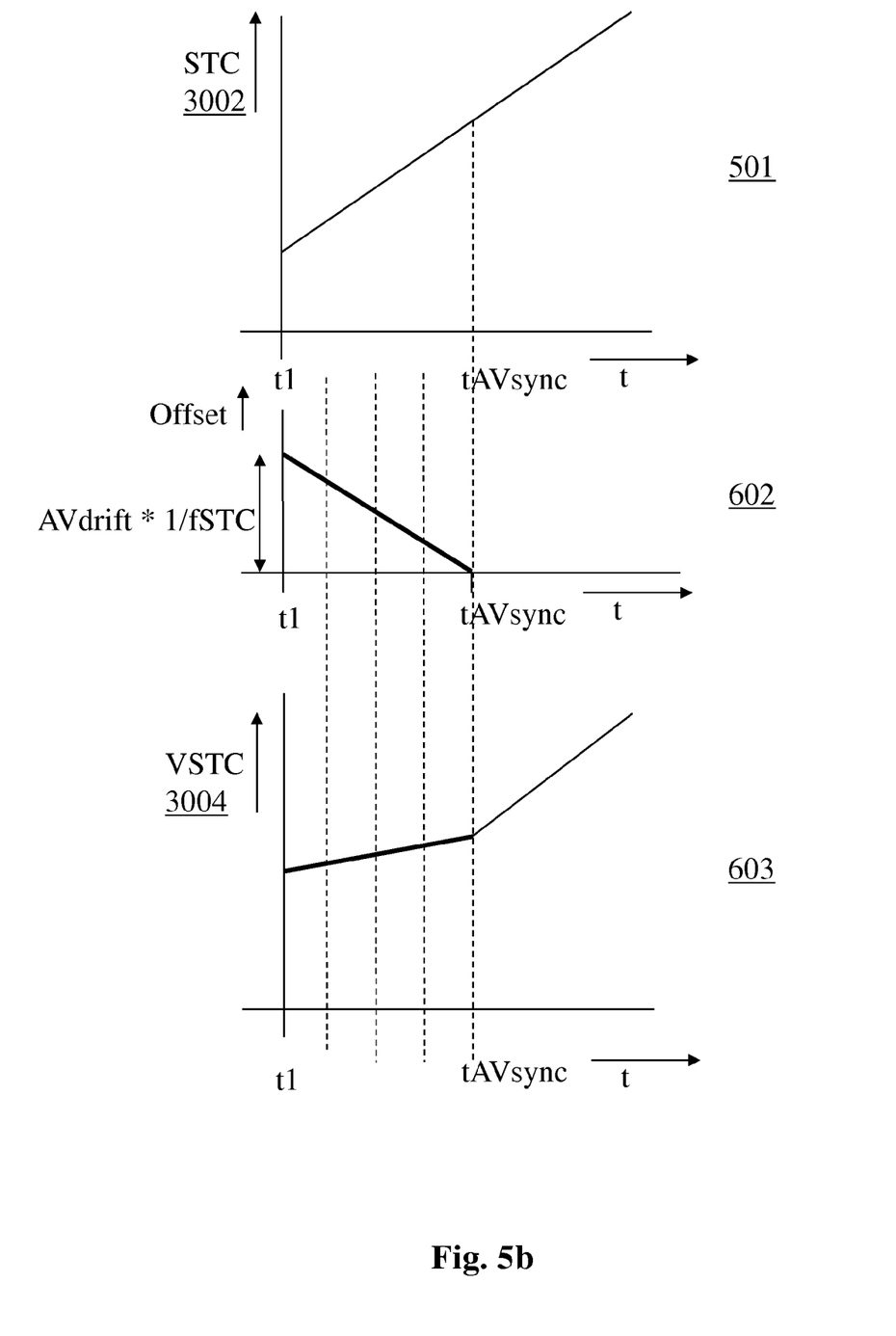
Figure 5C:
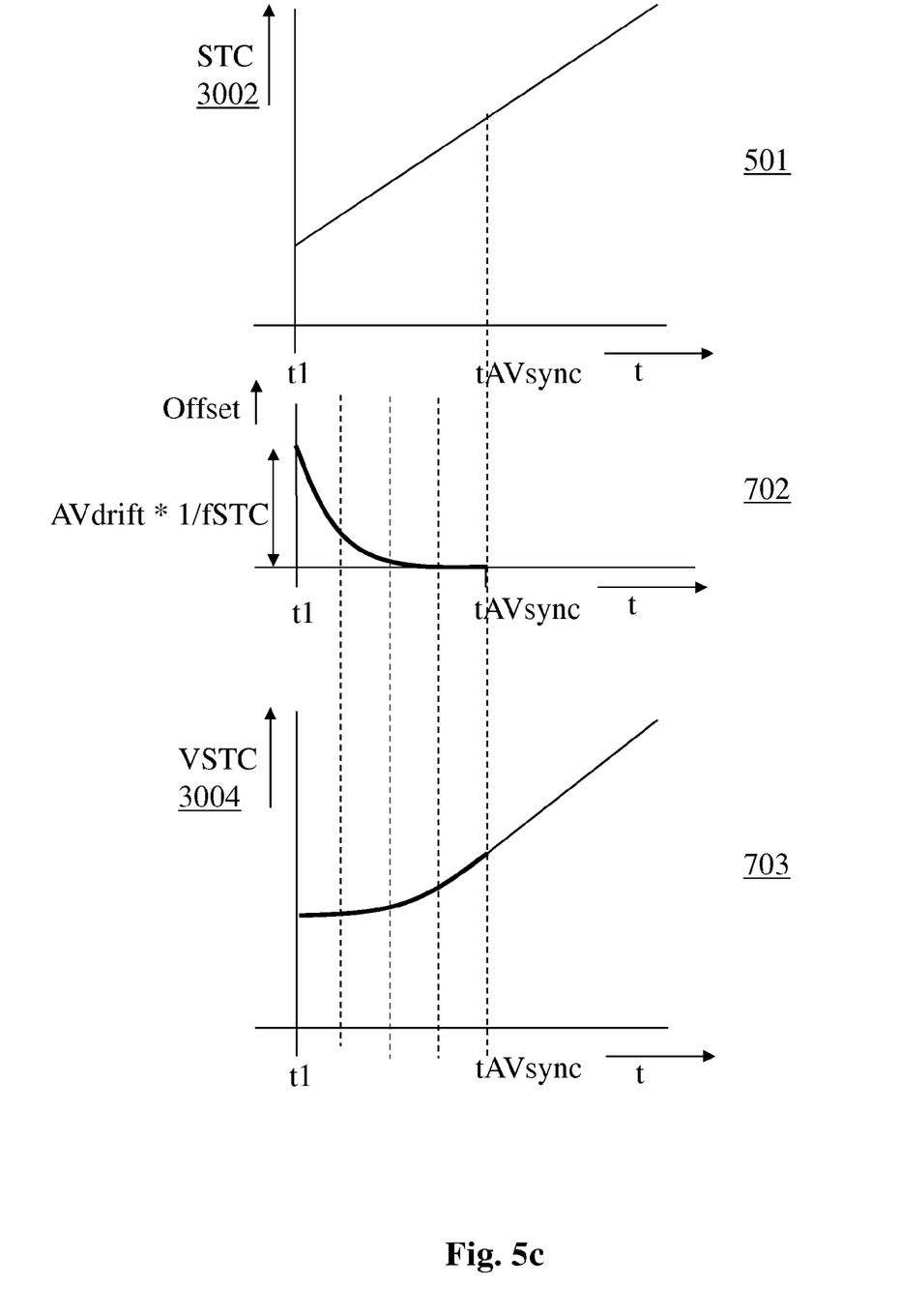

FIGS. 5*a-c* are a set of graphs that give a further visual explanation of a construction of VSTC 3004 values from the STC 3002. Turning to FIG. 5*a*, in graph 501 the STC 3002 is initialized at t1 14 with a PCR 3001 value retrieved from the audio/video stream 3000 (PCR@t1). Then, the STC 3002 has a linear progression. Graph 502 is the evolution of the offset value that is added to the STC 3002. The offset to add at t1 14 is computed (obtained) according to equation (3). From t1 14 to tAVsync 15, the offset is stepwise decreased to reach zero at tAVsync 15. Adding the offset to the STC 3002 results in a VSTC 3004 according to graph 503. For a viewer, this stepwise reduction may result in video acceleration jumps until the slowly played (decoded) video synchronizes with the audio and audio at tAVsync 15. According to the further embodiment of FIG. 5*b*, the offset 602 is decreased in a linear manner, resulting in a VSTC 3004 that evolves according to graph 603. For a viewer this creates a smooth slow video effect until the slowly played (decoded) video joins the audio at tAVsync 15. According to a further embodiment of FIG. 5*c*, the offset is decreased in an exponential manner, see graph 702, resulting in a VSTC 3004 that evolves as depicted in graph 703. For a viewer this creates a slowly starting and then rapidly accelerating video accelerating effect until the slowly played (decoded) video joins the audio at tAVsync 15.

According to a further embodiment a loop is added to the processing so that any variations of AVdrift when the offset has not yet converged to zero is taken into account. If AVdrift decreases, the video decoding speed can be modified to converge more quickly to that of the audio, resulting in an acceleration of video movement. If AVdrift increases, the video decoding speed should be set to converge less quickly to that of the audio, resulting in a slowing down video movement. The decreasing of the offset value is thus reevaluated as a function of the varying AVdrift.

Figure 6:
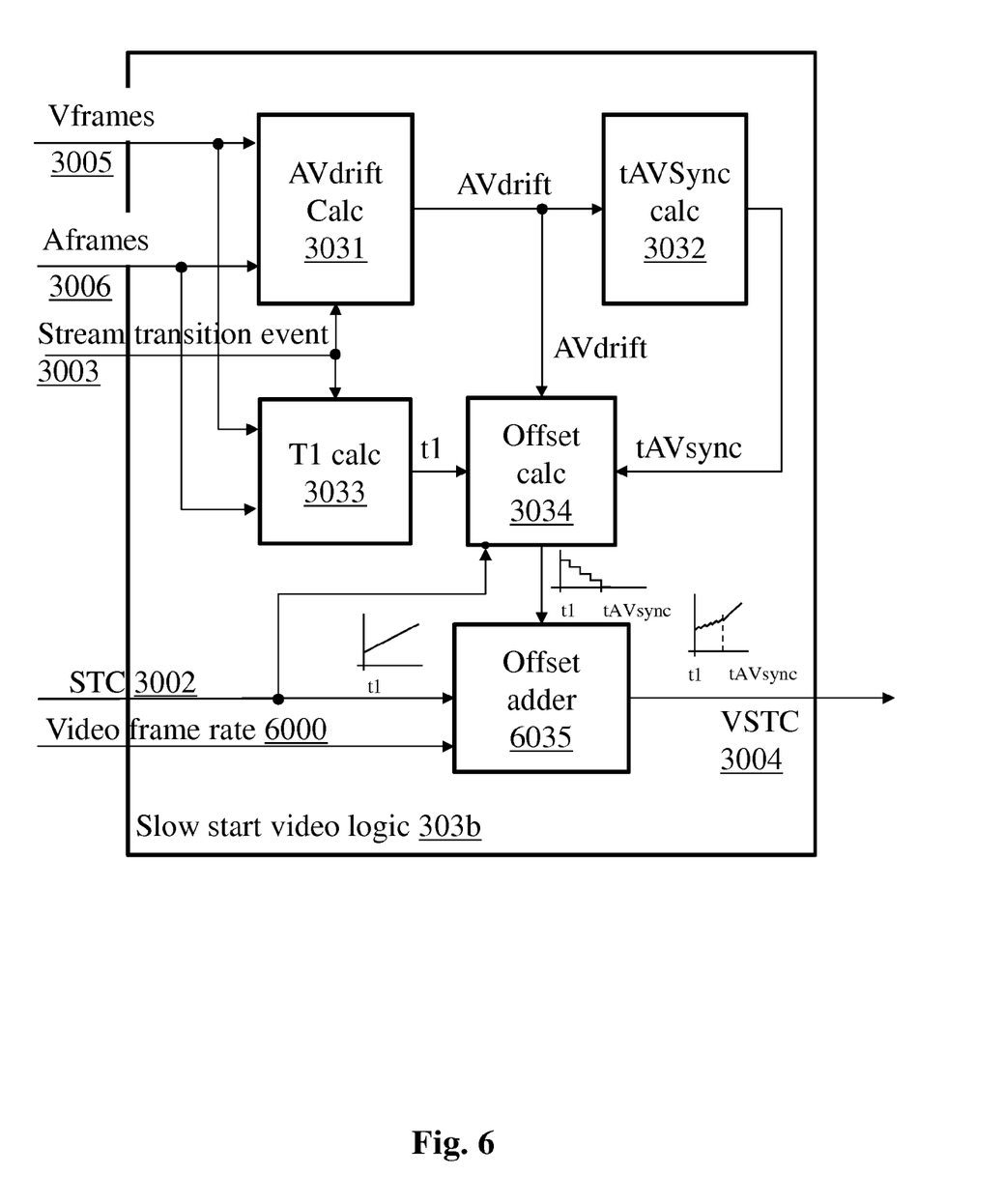
FIG. 6 is a block diagram of a different embodiment of a slow-start video logic according to the present principles.

FIG. 6 is a block diagram of a different embodiment 303*b* of slow-start video logic 303. According to this embodiment, the offset add operations done by offset adder 6035 are synchronized with the video frame rate to reduce the appearance of visible artefacts such as video jittering. Such an embodiment is depicted in FIG. 6. The video frame rate of a video stream is obtained from header information in each individual elementary stream e.g. in the Sequence Parameter Set (SPS) for a H.264 video stream. The embodiment is similar to that of FIG. 4, except that an additional input parameter "video frame rate" 6000 is provided to the offset adder 6035. According to this embodiment, the offset adder synchronizes the modifications to the STC 3002 with the determined video frame rate 6000.

Figure 7:
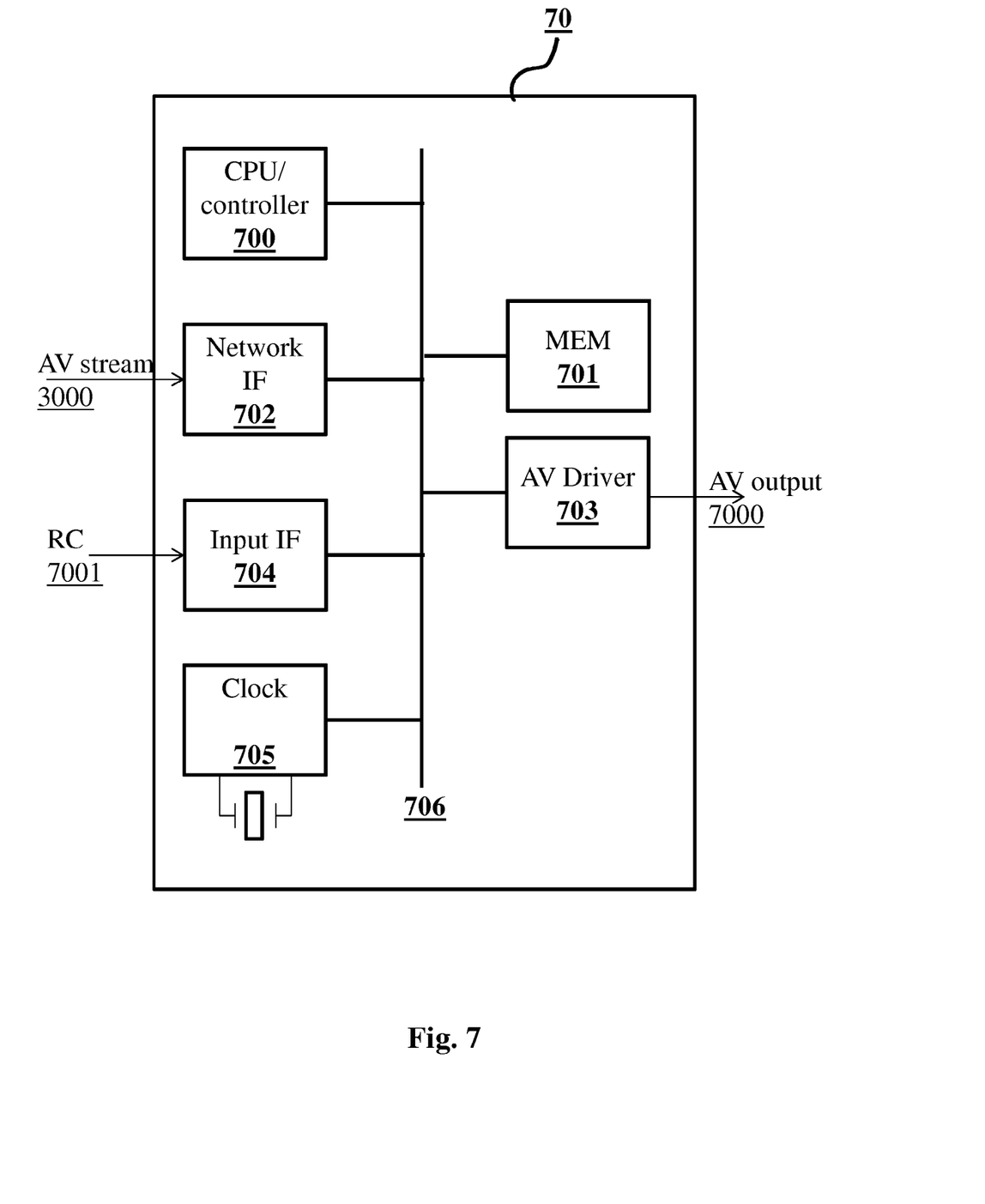
FIG. 7 is an example embodiment of a receiver device according to the present principles that is alternative to the embodiment depicted in FIG. 3.

FIG. 7 is an example embodiment of a receiver device according to the present principles that is alternative to the embodiment 30 depicted in FIG. 3. An audio/video stream AVstream 3000 is received from a streaming source (not shown). The audio/video stream 3000 is delivered to the receiver's demultiplexer 301. Based on the audio and video program identifiers (PIDs) of elementary program streams included in the audio/video stream 3000, a software demultiplexer is executed by CPU/controller 700 to separate the multiplexed audio/video stream 3000, received via a network interface 702 or a tuner (not shown), into a video frame stream and an audio frame stream. Each of these separate streams is buffered separately in a buffer in memory 701 which is of a size that is sufficient to avoid data starvation; video frames are buffered in a video buffer, while audio frames are buffered in an audio buffer. The demultiplexer also retrieves PCRs from the audio/video stream 3000 from packets containing PCR. These PCRs are provided to a System Time Clock STC that is derived from hardware clock 705, and are used to synchronize the STC with the encoder clock. The device includes a software video decoder and a software audio decoder, the software being executed by the CPU/controller. The release of decoded audio frames is triggered from t1 14 by the STC clock. The release of decoded video frames is triggered from tAVsync 15 by the STC clock. The release of decoded video frames is triggered from t1 14 to tAVsync 15 by the STC clock plus an offset. A video decoding clock VSTC is provided to the video decoder by slow-start video logic 303 implemented in software and executed by the CPU/controller 700. Slow-start video logic 303 receives as inputs the STC clock from STC, the non-buffered video frames and the non-buffered audio frames, a stream transition event, and produces as output the video decoding clock VSTC to the video decoder. Video decoder and audio decoder produce decoded video respectively decoded audio, which is fed to a video respectively audio interface driver 703 such as according to DVI (Digital Video Interface) or HDMI (High Definition Multimedia Interface) output 7000. It can thus be seen that according to the present principles, there is only a single hardware clock 705 that produces the STC which is provided to the audio- and video decoders (however to the video decoder with an offset during the slow-start video motion sequence). Input interface 704 allows to receive input commands for example from a remote control 7001, such as a channel change command. Element 706 is an internal control- and data communication bus that allows communication between the elements 700 to 705 constituting device 70.

Figure 8:
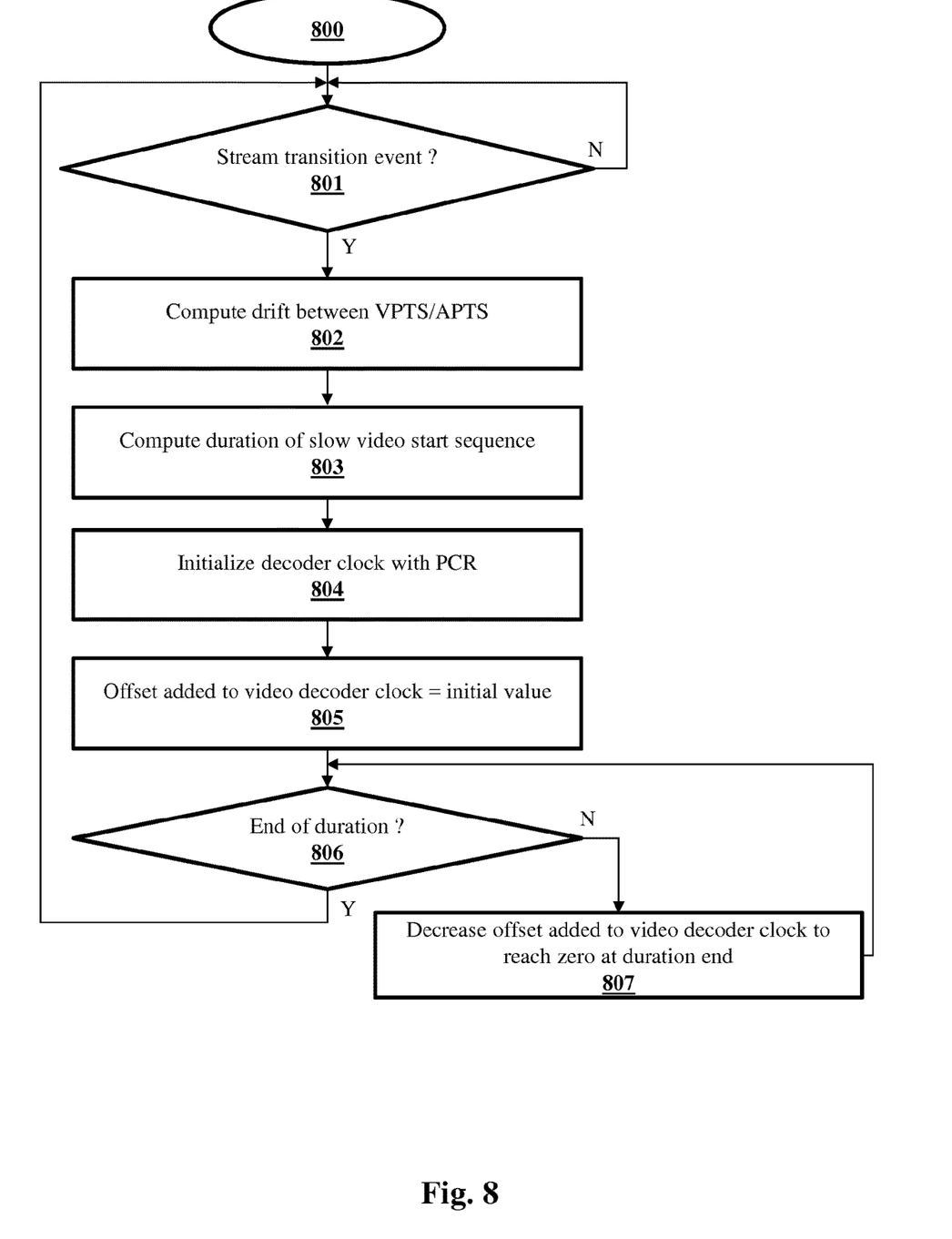
FIG. 8 is a flow chart of a method for decoding an audio/video stream according to an exemplary embodiment of the present principles.

FIG. 8 is a flow chart of particular embodiment of a decoding method according to the present principles. The method as depicted is for example implemented in device 30 of FIG. 3 of in the device 70 of FIG. 7.

The flow chart starts with initialization step 800. Step 801 loops until a stream transition event (e.g. channel change) is received. An audio/video stream is then received corresponding to the stream transition event. Based on information included in the received audio/video stream, a drift between a video presentation time stamp and an audio presentation time stamp included in (present in, obtained from) the audio/video stream is computed (obtained) in step 802. In step 803 a duration of a slow video motion start sequence based on the drift and as a function of a slow video play (decoding) rate used for playing (decoding) the video during the duration of the slow video motion start sequence. In a step 804, a decoder clock is initialized with a value of a program clock reference found in (present in, obtained from) the audio/video stream. The decoder clock is provided to an audio decoder included in the audio/video stream receiver and the same decoder clock is also provided to a video decoder included in the audio/video stream receiver; however the decoder clock provided to the video decoder is offset with an initial non-zero offset value and with a decreasing offset value until the offset reaches a zero offset value at the end of the duration of the slow video motion start sequence. The latter operations are performed in steps 805-807, i.e. setting the offset to add to the video decoder clock to an initial value 805, decreasing the offset to add to the decoder clock in step 807 and looping back to step 807 via step 806 until the offset to add to the decoder clock reaches zero at the end of the duration of the slow video motion start sequence.

It is to be appreciated that some elements in the drawings may not be used or be necessary in all embodiments. Some operations may be executed in parallel. Variant embodiments other than those illustrated and/or described are possible. For example, the arrangement may be included in a connector cable.

It is to be appreciated that aspects of the present principles can be embodied as a system, method or computer readable medium. Accordingly, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method for decoding an audio/video stream, wherein the method is implemented by an audio/video stream receiver and comprises:
   receiving a stream transition event;
   receiving an audio/video stream further to the stream transition event;
   computing a drift between a video presentation time stamp comprised in said audio/video stream and an audio presentation time stamp comprised in said audio/video stream;
   obtaining a duration of a slow video motion start sequence;

initializing a decoder clock with a value of a program clock reference from said audio/video stream;

providing said decoder clock to an audio decoder in said audio/video stream receiver;

providing said decoder clock to a video decoder in said audio/video stream receiver, said decoder clock provided to said video decoder being offset with an initial non-zero offset value and with a decreasing offset value until said offset reaches a zero offset value at the end of said duration of said slow video motion start sequence; and synchronizing offsetting of said decoder clock provided to said video decoder with a frame rate of video comprised in said audio/video stream.

2. The method according to claim 1, wherein said offset value is decreased during said duration according to a linear function.

3. The method according to claim 1, wherein said offset value is decreased during said duration according to an exponential function.

4. The method according to claim 1, wherein the decreasing of the offset value is reevaluated as a function of variations of said drift.

5. The method according to claim 1, wherein said initial non-zero offset value being a function of said computed drift and of a frequency of said decoder clock, said decreasing offset value being a function of said initial non-zero offset value and of a number of clock ticks of said decoder clock during said duration of said slow video motion start sequence.

6. A device for decoding an audio/video stream, wherein said device comprises:

at least one reception interface configured to:
receive a stream transition event; and
receive an audio/video stream further to the stream transition event;

a processor configured to:
compute a drift between a video presentation time stamp and an audio presentation time stamp comprised in said audio/video stream;
obtain a duration of a slow video motion start sequence;
initialize a decoder clock with a value of a program clock reference from said audio/video stream;
provide said decoder clock to an audio decoder comprised in said device;
provide said decoder clock to a video decoder comprised in said device, said decoder clock provided to said video decoder being offset with an initial non-zero offset value and with a decreasing offset value until said offset reaches a zero offset value at the end of said duration of said slow video motion start sequence; and
synchronize the offsetting of said decoder clock provided to said video decoder with a frame rate of video comprised in said audio/video stream.

7. The device according to claim 6, wherein said processor is further configured to decrease said offset value during said duration according to a linear function.

8. The device according to claim 6, wherein said processor is further configured to decrease said offset value during said duration according to an exponential function.

9. The device according to claim 6, wherein said processor is further configured to reevaluate decreasing of the offset value as a function of variations of said drift.

10. The device according to claim 6, wherein said processor is further configured to compute said initial non-zero offset value as a function of said drift and of a frequency of said decoder clock, said decreasing offset value being a function of said initial non-zero offset value and of a number of clock ticks of said decoder clock during said duration of slow video motion start sequence.

* * * * *